US010137750B2

(12) United States Patent
Macnamara

(10) Patent No.: US 10,137,750 B2
(45) Date of Patent: Nov. 27, 2018

(54) CONTROLLER AND METHOD FOR CONTROLLING A LIFT AXLE AND AIR SUSPENSION ON A TRAILER

(71) Applicant: Bendix Commercial Vehicle Systems LLC, Elyria, OH (US)

(72) Inventor: Joseph M Macnamara, Ashland, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 90 days.

(21) Appl. No.: 15/053,046

(22) Filed: Feb. 25, 2016

(65) Prior Publication Data

US 2017/0246926 A1    Aug. 31, 2017

(51) Int. Cl.
*B60G 17/015* (2006.01)
*B60G 17/019* (2006.01)
(Continued)

(52) U.S. Cl.
CPC ....... *B60G 17/0155* (2013.01); *B60G 17/018* (2013.01); *B60G 17/0526* (2013.01); *B62D 61/12* (2013.01); *B60G 2202/152* (2013.01); *B60G 2204/4702* (2013.01); *B60G 2300/04* (2013.01); *B60G 2400/208* (2013.01); *B60G 2400/51222* (2013.01);
(Continued)

(58) Field of Classification Search
CPC .............. B60G 17/015; B60G 17/0155; B60G 17/01933; B60G 2200/30; B60G 2400/204; B60G 2400/51222; B60G 2800/91; B62D 63/08

USPC ................ 280/5.512, 124.116, 124.157, 5.5; 701/50, 48, 5.512, 124.116, 124.157, 5.5
See application file for complete search history.

(56) References Cited

U.S. PATENT DOCUMENTS 3,201,141 A    8/1965  Robert
3,920,283 A    11/1975 Strader
(Continued)

FOREIGN PATENT DOCUMENTS

CN        202657018 U    1/2013
CN        102407749 B    8/2014
(Continued)

OTHER PUBLICATIONS

Bendix Commercial Vehicle Systems LLC, "SD-13-21021: Bendix eTrac Automated Air Pressure Transfer System," Service Data Sheet, Nov. 2014, 8 pages, Bendix Commercial Vehicle Systems LLC, Elyria OH USA.
(Continued)

*Primary Examiner* — Nga X Nguyen
(74) *Attorney, Agent, or Firm* — Cheryl L. Greenly; Brian E. Kondas; Eugene E. Clair

(57) ABSTRACT

A trailer having a liftable first axle and an air suspended second axle includes a controller, a first valve coupled to the first axle and a second valve coupled to the second axle. The controller receives an air suspension exhaust request signal and a pressure signal from an air suspension bellows coupled to the second axle. The controller transmits an air suspension control signal to the second valve in response to the air suspension exhaust request signal and transmits a lift axle control signal to the first valve to lower the first axle in response to the pressure signal being less than a predetermined pressure value.

17 Claims, 3 Drawing Sheets

(51) Int. Cl.
*B62D 63/08* (2006.01)
*B60G 17/018* (2006.01)
*B60G 17/052* (2006.01)
*B62D 61/12* (2006.01)

(52) U.S. Cl.
CPC .. *B60G 2500/2012* (2013.01); *B60G 2500/30* (2013.01); *B60G 2800/91* (2013.01)

(56) References Cited

U.S. PATENT DOCUMENTS

| | | | |
|---|---|---|---|
| 4,854,409 A | 8/1989 | Hillebrand | |
| 5,887,880 A | 3/1999 | Mullican | |
| 7,222,867 B2 | 5/2007 | Rotz | |
| 7,938,411 B2 | 5/2011 | Stahl | |
| 8,047,512 B2 | 11/2011 | Mizushima et al. | |
| 8,677,909 B2 | 3/2014 | Kumar | |
| 8,892,307 B2 | 11/2014 | Fazzalari | |
| 8,935,054 B2 * | 1/2015 | Mantini | B60G 17/019 280/81.6 |
| 9,637,189 B2 * | 5/2017 | Karel | B62D 61/12 |
| 2009/0033055 A1 * | 2/2009 | Morris | B60G 17/0155 280/124.16 |
| 2010/0077715 A1 * | 4/2010 | Hohlfeld | A01D 41/127 56/228 |

FOREIGN PATENT DOCUMENTS

| | | |
|---|---|---|
| EP | 0435587 A2 | 7/1991 |
| JP | 02902544 B2 | 6/1999 |
| JP | 3213168 A | 10/2001 |

OTHER PUBLICATIONS

Heavy Duty Trucking Magazine, "Trailer Report: Making Sense of Spread Tandems," Internet article, Dec. 1, 2015, 3 pages, truckinginfo.com, USA.
Hendrickson USA LLC, "OM-H754: Steerable Auxiliary Axle Systems," Owner's Manual, Apr. 2015, 16 pages, Hendrickson USA LLC, Hebron OH, USA.

* cited by examiner

CONTROLLER AND METHOD FOR CONTROLLING A LIFT AXLE AND AIR SUSPENSION ON A TRAILER

BACKGROUND

The present invention relates to embodiments of a controller and method for controlling a lift axle and an air suspension on a commercial vehicle trailer. Some fleet owners and tractor-trailer vehicle operators want the flexibility to lift a front axle of the trailer off the ground when the trailer is unloaded, or lightly loaded, in order to preserve axle life, reduce tire wear, improve fuel economy and increase drivability of the trailer. Some fleet owners and tractor-trailer vehicle operators want the flexibility to exhaust the rear axle air suspension to improve maneuverability of the trailer and reduce tire wear. At least one trailer manufacturer has introduced both features on trailers with dual axles. However, if the air suspension was exhausted on the rear axle at the same time the lift axle was raised, damage to the rear axle suspension and rear tires is likely to occur. When lift axle and air suspension systems are manually controlled, the operator of the tractor trailer vehicle must ensure that exhaustion of the rear air suspension does not occur until the lift axle is returned to its normal lowered position. Therefore, there is a need to coordinate the operation of the lift axle with the operation of the air suspension without relying on operator intervention.

SUMMARY

Various embodiments of an apparatus for a trailer having a liftable first axle and an air suspended second axle comprise a controller, a first valve and a second valve. The controller is capable of receiving an air suspension exhaust request signal; receiving a pressure signal from an associated air suspension bellows coupled to an associated air suspended second axle; transmitting a lift axle signal to control an associated liftable first axle; and transmitting an air suspension control signal to control the associated air suspended second axle. The first valve, coupled to the associated liftable first axle, receives the lift axle signal and the second valve, coupled to the associated air suspended second axle, receives the air suspension control signal. The controller transmits the air suspension signal to the second valve in response to the air suspension exhaust request signal and transmits the lift axle signal to the first valve to lower the associated liftable first axle in response to the pressure signal being less than a predetermined pressure value.

In accordance with another aspect, various embodiments of a trailer controller comprise an air suspension bellows signal input for receiving a pressure signal indicative of a pressure value in the air suspension bellows; and a lift axle control output for transmitting a lift axle control signal. The trailer controller includes a processor having control logic, the control logic capable of receiving the air suspension bellows signal and transmitting the lift axle control signal to lower the lift axle in response to the pressure value being less than a predetermined pressure value.

In accordance with another aspect, various embodiments of a method of controlling a lift axle and an air suspension on a trailer are disclosed. One method of controlling a liftable first axle and an air suspended second axle on a trailer comprises receiving a signal indicative of a request to exhaust suspension pressure on the air suspended second axle; determining if the speed of the trailer is less than a predetermined speed; transmitting a control signal to exhaust suspension pressure in the air suspension bellows coupled to the air suspended second axle in response to the speed being less than a predetermined speed; receiving a signal indicative of a pressure value in the air suspension bellows; and transmitting a control signal to lower the liftable first axle in response to the pressure value in the air suspension bellows being less than a predetermined pressure value.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
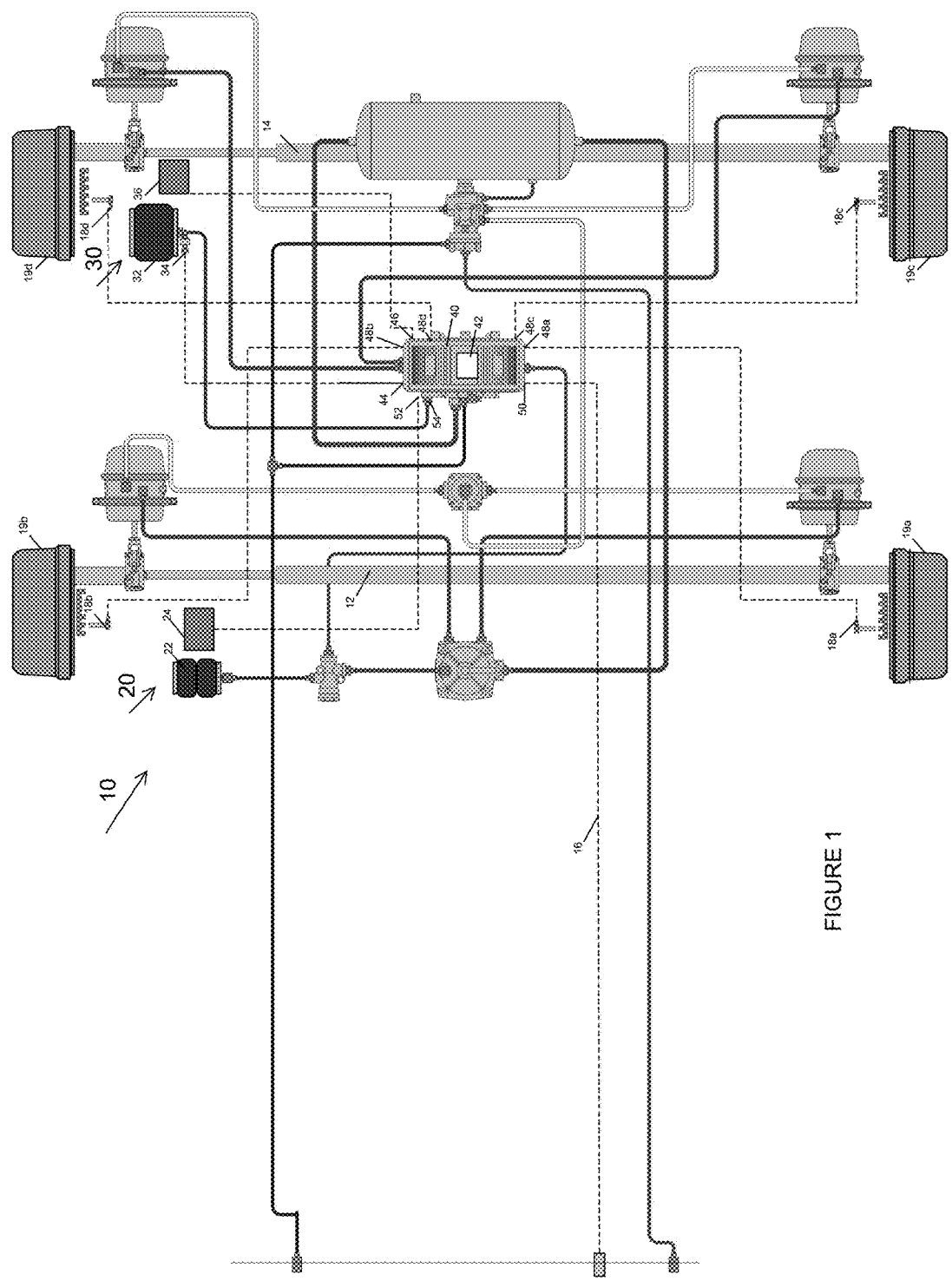
FIG. 1 illustrates a trailer with systems according to an example of this invention.

FIG. 1 illustrates a trailer 10 equipped with systems according to an example of this invention. The trailer 10 is connected electrically and pneumatically to a tractor (not shown). An electrical air suspension signal line 16 is representative of an arrangement to receive an electrical control signal at the trailer 10 from a manual air suspension switch on the tractor.

The trailer 10 comprises two axles, a first axle 12, also known as a lift axle or front axle, and a second axle 14, also known as a rear axle. The first axle 12 and second axle 14 may be spread apart by six feet or more, making the trailer 10 known as a "spread axle trailer." The first axle 12 has a left wheel end 19a and a right wheel end 19b. The left wheel end 19a and the right wheel end 19b are coupled to tires (not shown). The second axle 14 has a left wheel end 19c and a tight wheel end 19d, which are coupled to tires (not shown).

The trailer 10 includes four wheel speed sensors 18a, 18b, 18c, 18d for measuring the speed of the trailer 10. The wheel speed sensors 18a, 18b, 18c, 18d are installed individually at each of the four wheel ends 19a, 19b, 19c, 19d.

The trailer 10 includes a lift axle system 20 according to an example of this invention. In one example, the lift axle system 20 can raise the first axle 12 from a normal lowered position to a raised position in response to an unloaded or lightly loaded trailer. The lift axle feature saves wear on the first axle 12 when the first axle 12 is not necessary to support the load of the trailer 10. Therefore, the first axle 12 may also be known as a lift axle.

The lift axle system 20 illustrated on trailer 10 comprises a lift axle bellows 22 coupled to the first axle 12. The lift axle bellows 22 may be configured with two bellows, one for the left side of the first axle 12 and one for the right side of the first axle 12, but is shown as a single bellows in FIG. 1 for convenience. The lift axle bellows 22 is filled with air in order to raise the first axle 12 from a normal lowered position to a raised position. A first valve 24 is coupled to the lift axle bellows 22 to control the air supply to the lift axle bellows 22. The first valve 24 may be an electropneumatic valve or other valve for controlling air pressure to the lift axle bellows 22. The first axle 12 can be raised from about six (6) inches to about ten (10) inches from the normal lowered position of the first axle 12. When the first axle 12 is in the raised position, the tires of the first axle 12 left wheel end 19a and right wheel end 19b would no longer be touching the ground and would not support any weight of the trailer 10.

The trailer 10 includes an air suspension control system 30 according to an example of this invention. The air suspension control system 30 changes the effective wheel base of the trailer 10 to assist with maneuvering and to prevent tire wear at low speeds. The air suspension control system 30 comprises at least one air suspension bellows 32 coupled to the second axle 14. The at least one air suspension bellows 32 may be configured with four bellows, one for the left side of the first axle 12, one for the right side of the first axle 12, one for the left side of the second axle 14 and one for the right side of the second axle 14, but is shown as a single bellows in FIG. 1 for convenience. An air suspension bellows coupled to the first axle 12 would be isolated pneumatically from the at least one air suspension bellows 32 coupled to the second axle 14. The air suspension control system 30 would not exhaust air from any air suspension bellows coupled to the first axle 12. The at least one air suspension bellows 32 is supplied with pressure from an air reservoir and maintained at a specified predetermined pressure by a series of valves (not shown). A normal air suspension system maintains between about ten (10) psi in the air suspension bellows when the vehicle is not loaded and about one hundred (100) psi when the vehicle is fully loaded.

The air suspension control system 30 comprises a second valve 36 coupled pneumatically to the at least one air suspension bellows 32. When the second valve 36 is actuated, the air in the at least one air suspension bellows 32 is exhausted to atmosphere, but air in any air suspension bellows coupled to the first axle 12 would be isolated from the at least one air suspension bellows 32 and not be exhausted.

A pressure sensing device 34, such as a pressure sensor or pressure switch, measures the air pressure in the at least one air suspension bellows 32 and transmits a pressure signal. The pressure signal is indicative of a pressure value in the at least one air suspension bellows 32. The pressure sensing device 34 may be a normally open pressure switch that closes at a predetermined pressure value and transmits a pressure signal when the pressure is less than a predetermined pressure value. The pressure sensing device 34 may be a stand-alone pressure switch as shown or may be integrated inside a trailer controller 40. The pressure sensing device 34 may also be used in determining the weight of the trailer 10.

The trailer 10 also includes trailer controller 40. The trailer controller 40 includes wheel speed sensor inputs 48a, 48b, 48c, 48d for receiving wheel speed signals from wheel speed sensors 18a, 18b, 18c, 18d. The trailer controller 40 includes an air suspension signal input 50 for receiving the signal transmitted on the air suspension signal line 16. The trailer controller 40 includes an air suspension bellows signal input 44 for receiving a pressure signal indicative of a pressure value from the pressure sensing device 34. The trailer controller 40 includes a first output 52 for controlling the first valve 24 and a second output 46 for controlling the second valve 36. The trailer controller 40 may also include a pneumatic input 54 coupled to the at least one air suspension bellows 32.

The trailer controller 40 includes a processor with control logic 42 for controlling the lift axle control system 20 and the air suspension control system 30. The trailer controller 40 may also include functionality to control anti-lock braking on the trailer 10. The control logic 42 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 42.

Therefore, an apparatus for a trailer having a liftable first axle and an air suspended second axle comprise a controller, a first valve and a second valve. The controller is capable of receiving an air suspension exhaust request signal; receiving a pressure signal from an associated air suspension bellows coupled to an associated air suspended second axle; transmitting a lift axle signal to control an associated liftable first axle; and transmitting an air suspension control signal to control the associated air suspended second axle. The first valve, coupled to the associated liftable first axle, receives the lift axle signal and the second valve, coupled to the associated air suspended second axle, receives the air suspension control signal. The controller transmits the air suspension signal to the second valve in response to the air suspension exhaust request signal and transmits the lift axle signal to the first valve to lower the associated liftable first axle in response to the pressure signal being less than a predetermined pressure value.

Furthermore, various embodiments of a trailer controller comprise an air suspension bellows signal input for receiving a pressure signal indicative of a pressure value in the air suspension bellows and a lift axle control output for transmitting a lift axle control signal. The trailer controller includes a processor having control logic, the control logic capable of receiving the air suspension bellows signal and transmitting the lift axle control signal to lower the lift axle in response to the pressure value being less than a predetermined pressure value.

Figure 2:
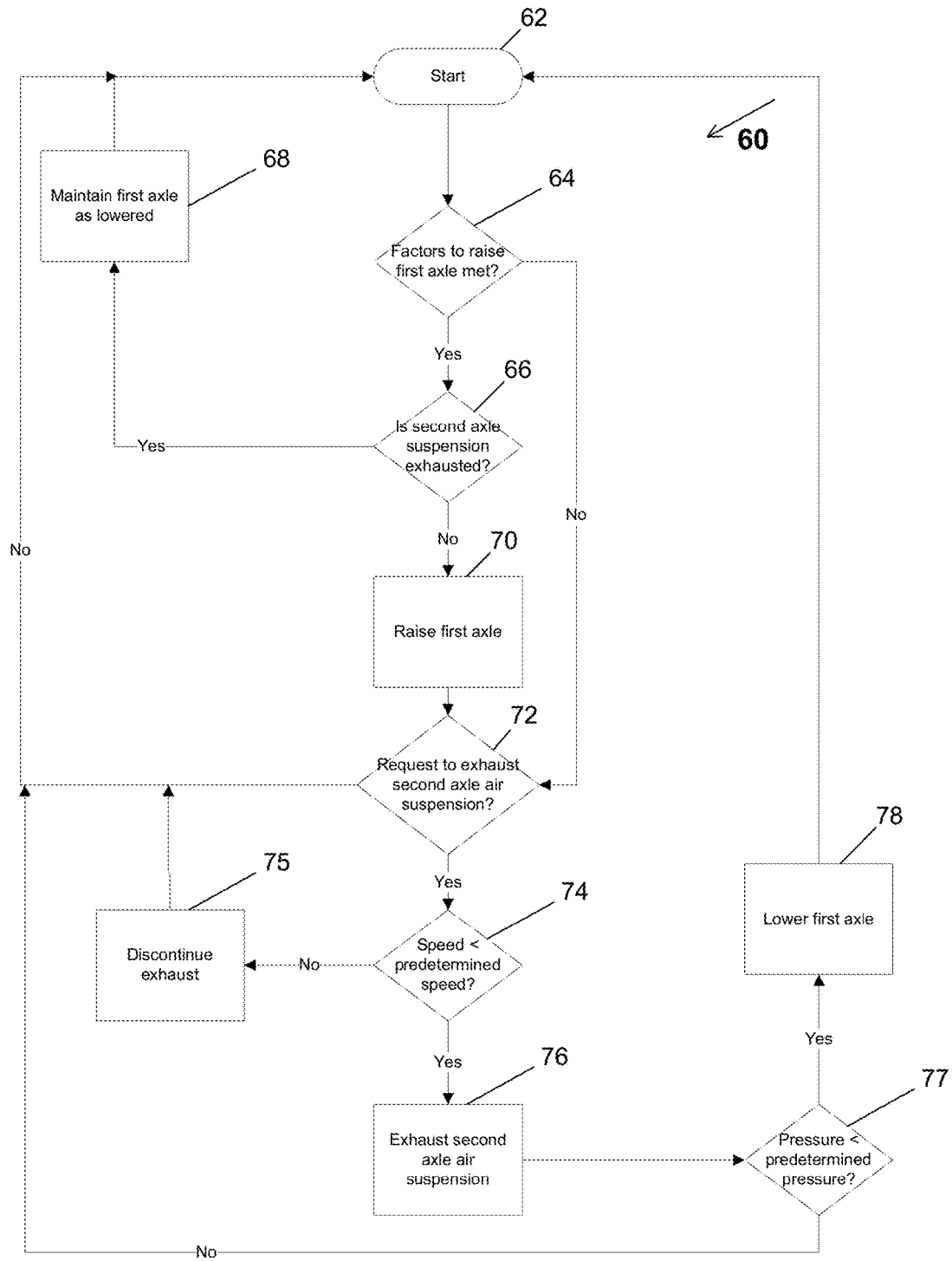
FIG. 2 illustrates a flow chart for a method of controlling the trailer systems according to an example of this invention.

FIG. 2 illustrates a method 60 for controlling the lift axle system 20 and the air suspension system 30 of trailer 10 where the rear axle suspension exhaustion takes precedence over the lift axle control. The method 60 begins at step 62. At step 64, the control logic 42 determines whether to raise the first axle 12, also known as a lift axle, based on several factors. A determination to raise the first axle 12 may be made automatically by the control logic 42 in response to speed, weight or other vehicle factors. For example, the control logic 42 may only allow the first axle 12 to be raised when the weight is less than a predetermined weight. The weight of the trailer 10 may be determined using the pressure input 54. In one example for a two axle trailer, the predetermined weight is less than half of the rated load for the trailer 10. In an example for a three axle trailer, the predetermined weight is less than one third of the rated load for the trailer 10. If the predetermined vehicle factors are met, the method proceeds to step 66. If the predetermined factors are not met, the method 60 proceeds to step 72 and the first axle 12 is not raised.

In step 66, the control logic 42 determines if the air suspension bellows 32 on the second axle 14 is already exhausted. If the second axle 14 is already exhausted, the method proceeds to step 68 where the control logic 42 maintains the first axle 12 as lowered. From step 68, the method 60 returns to the beginning step 62. If the second axle 14 is not already exhausted, the method 60 proceeds to step 70.

In step 70, the control logic 42 raises the first axle 12 in response to the predetermined vehicle factors being met. The control logic 42 controls the raising of the first axle 12 by transmitting a control signal via output 52 to the first valve 24. The first valve 24 in response will fill the at least one lift axle bellows 22 with air so that the first axle 12 will be lifted from the normal lowered position to a raised position. Any air suspension bellows only associated with the first axle 12 would be exhausted at the same time. The control logic 42 can check that the first axle 12 is in the raised position by monitoring the wheel speed sensors 18*a*, 18*b* at wheel speed inputs 48*a*, 48*b*. The wheel speed signals should be about zero when the first axle 12 is in the raised position. Even if the wheel ends 19*a*, 19*b* were still rotating, the speed at wheel speed inputs 48*a*, 48*b* would be different than the speed at wheel speed inputs 48*c*, 48*d*.

In step 72, the control logic 42 determines if a request to exhaust the air suspension on the second axle 14 has been received. The request to exhaust the air suspension is generally received via the air suspension signal line 16 at the air suspension signal input 50 from the driver of the tractor. If the air suspension exhaust switch is not activated by the vehicle operator, the method 60 will return to the beginning step 62. If a request to exhaust the second axle 14 is received in step 72, the method 60 proceeds to step 74.

The control logic 42 determines the speed of the trailer 10 in step 74, prior to exhausting the at least one air suspension bellows 32. The speed may be determined from the wheel speed sensors 18*a*, 18*b*, 18*c*, 18*d* or other means of measuring the speed on the trailer 10. If the speed of the trailer 10 is greater than or equal to a predetermined speed, the control logic 42 will proceed to step 75. In step 75, the control logic 42 will not exhaust, or discontinue any exhaustion of, the at least one air suspension bellows 32. The method 60 will then return to the beginning step 62. In one example, the predetermined speed is about ten (10) miles per hour.

If the speed of the trailer 10 is less than the predetermined speed, the method 60 will proceed to step 76 where the control logic 42 will begin to exhaust the at least one air suspension bellows 32. The control logic 42 exhausts the at least one air suspension bellows 32 by transmitting a control signal via the second valve control output 46 in order to activate second valve 36. Second valve 36 will then open a path to atmosphere from the at least one air suspension bellows 32 to begin to exhaust the at least one air suspension bellows 32 and lower the pressure. Pressure sensing device 34 transmits a signal indicative of the pressure value in the air suspension bellows 32 to the control logic 42 at air suspension bellows signal input 44. During this operation, the speed of the trailer 10 is checked in step 77. If the speed of the trailer 10 would exceed about fifteen (15) mph, the control logic 42 would discontinue the exhaustion of the at least one air suspension bellows 32 to protect the second axle 14 and the air suspension system 30 and the method 60 would return to step 62. If the speed of the trailer 10 is less than the predetermined speed, the method 60 proceeds to step 77.

In step 77, the control logic 42 determines if the pressure value in the air suspension bellows 32 is less than a predetermined pressure value. In one example, the predetermined pressure value is between about three (3) pounds per square inch (psi) and about eight (8) psi. In another example, the predetermined pressure value is about five (5) psi. The predetermined pressure value is a value prior to which the air suspension bellows would be substantially exhausted. If the pressure value is greater than or equal to the predetermined pressure value, the method 60 returns to step 62. If the pressure value is less than the predetermined pressure value, the method continues to step 78.

In step 78, the first axle 12 is lowered automatically by the control logic 42. The automatic lowering of the first axle 12 prevents damage that could be done to the second axle 14 as the air suspension is exhausted. By lowering the first axle 12 automatically when the air suspension bellows pressure value goes below a predetermined pressure value, damage to the second axle 14 can be avoided as the weight will shift back to the first axle 12 when the first axle 12 is lowered to its normal position. After the first axle 12 is lowered, the method 60 returns to the beginning step 62.

Therefore, a method of controlling a lift axle and an air suspension on a trailer are disclosed. One method of controlling a liftable first axle and an air suspended second axle on a trailer comprises receiving a signal indicative of a request to exhaust suspension pressure on the air suspended second axle; determining if the speed of the trailer is less than a predetermined speed; transmitting a control signal to exhaust suspension pressure in the air suspension bellows coupled to the air suspended second axle in response to the speed being less than a predetermined speed; receiving a signal indicative of a pressure value in the air suspension bellows; and transmitting a control signal to lower the liftable first axle in response to the pressure value in the air suspension bellows being less than a predetermined pressure value.

Figure 3:
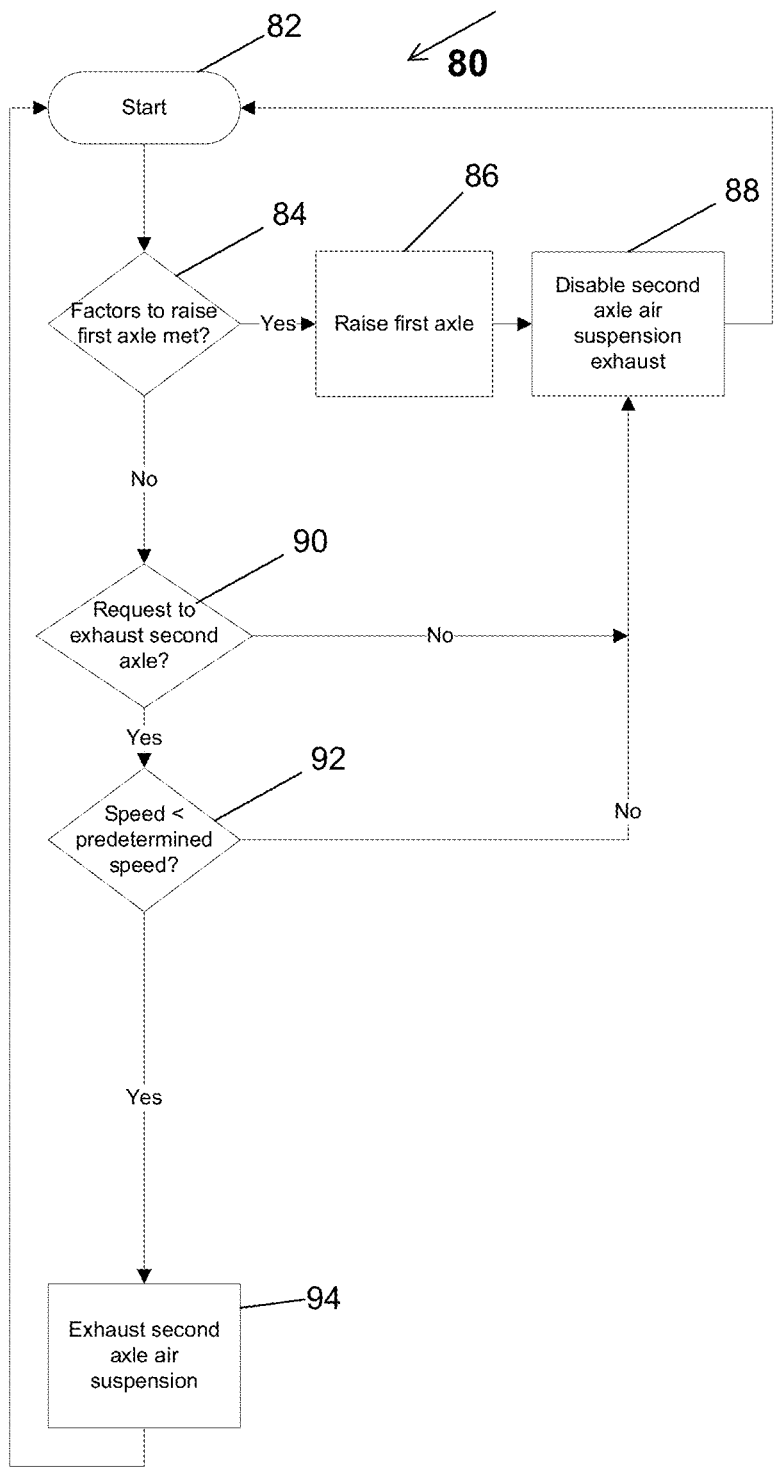
FIG. 3 illustrates a flow chart for another method of controlling the trailer systems according to an example of this invention.

FIG. 3 illustrates a method 80 for controlling the lift axle system 20 and the air suspension system 30 of trailer 10 where the lift axle control takes precedence over the rear axle suspension exhaustion. The method 80 begins at step 82. At step 84, the control logic 42 determines whether to raise the first axle 12 based on several factors. The determination to raise the first axle 12 may be made automatically by the control logic 42 in response to speed, weight or other vehicle factors. For example, the control logic 42 may only allow the first axle 12 to be raised when the weight on the second axle 14 is less than a predetermined weight. In one example, the predetermined weight is less than half of the rated load for the trailer 10. If the predetermined factors are met, the method proceeds to step 86.

In step 86, the first axle 12 is raised. The control logic 42 controls the raising of the first axle 12 by transmitting a control signal via output 52 to the first valve 24. The first valve 24 in response will fill the at least one lift axle bellows 22 with air so that the first axle 12 will be lifted from the ground and will also exhaust any air suspension bellows coupled to the first axle 12. The control logic 42 can check that the first axle 12 is properly raised by monitoring the wheel speed sensors 18*a*, 18*b* at wheel speed inputs 48*a*, 48*b*.

After the first axle 12 is raised, the method 80 proceeds to step 88 and the control logic 42 disables control of the suspension control system 30 so that the air suspension bellows 32 would not be permitted to be exhausted, regardless of the source of the request. The method 80 then returns to beginning step 82.

If the predetermined factors to raise the first axle 12 are not met, the method 80 proceeds to step 90. In step 90, the control logic 42 determines if a request to exhaust the air suspension on the second axle 14 has been received. The request to exhaust the air suspension is generally received via the air suspension signal line 16 at the air suspension signal input 50 from the driver of the tractor. If the exhaust switch is not activated by the vehicle operator, the method 80 will proceed to step 88.

If a request to exhaust the second axle 14 is received in step 90, the method 60 proceeds to step 92. Prior to exhausting the at least one air suspension bellows 32, the control logic 42 determines the speed of the trailer 10 in step 92. The speed may be determined from the wheel speed sensors 18a, 18b, 18c, 18d or other means of measuring the speed on the trailer 10. If the speed of the trailer 10 is greater than or equal to a predetermined speed, the control logic 42 will prohibit the at least one air suspension bellows 32 from being exhausted. The method 80 will proceed to step 88. In one example, the predetermined speed is about ten (10) miles per hour.

If the speed of the trailer 10 is less than the predetermined speed, the method 80 will proceed to step 94 where the control logic 42 will exhaust the at least one air suspension bellows 32. The control logic 42 exhausts the at least one air suspension bellows 32 by transmitting a control signal via the second valve control output 46 in order to activate second valve 36. Second valve 36 will then open a path to atmosphere from the at least one air suspension bellows 32 to begin to exhaust the at least one air suspension bellows 32 and lower the pressure. The method 80 then proceeds to the beginning step 82.

Therefore, a method of controlling a lift axle and air suspension on a trailer comprises determining if the factors are met to raise the liftable first axle. The method raises the lift axle while disabling the rear suspension exhaust capability in response to the request to raise the lift axle. If the factors to raise the lift axle are not met, the lift axle will not be raised and the system will then accept a request to exhaust suspension pressure. When the signal indicative of a request to exhaust suspension pressure on the air suspended second axle is received, the control logic will determine if the speed of the trailer is less than a predetermined speed and transmit a control signal to exhaust suspension pressure in the suspension air bellows.

The present invention includes control of both the lift axle and air suspension systems based on the pressure in the air suspension bellows in order to interlock the functions and protect both the lift axle and rear axle of the trailer. The control of the lowering of the lift axle is done in response to the pressure value in the air suspension bellows being less than a predetermined pressure and is automatic in the sense that this feature does not require operator intervention.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A trailer controller comprising:
    an air suspension bellows signal input for receiving a signal indicative of a pressure value in an air suspension bellows;
    a lift axle control output for transmitting a lift axle control signal; and
    a processor having control logic, the control logic capable of:
        receiving the air suspension bellows signal;
        transmitting the lift axle control signal to lower the lift axle in response to the pressure value in the air suspension bellows being less than a predetermined pressure value.

2. The trailer controller as in claim 1, further comprising:
    an air suspension request input for receiving an air suspension signal indicative of a request to exhaust suspension air pressure in the air suspension bellows; and
    an air suspension control output for transmitting an air suspension control signal to control the pressure in the air suspension bellows; wherein the control logic is further capable of receiving the air suspension signal indicative of a request to exhaust suspension pressure and transmitting the air suspension control signal to exhaust pressure in the air suspension bellows in response to the air suspension signal indicating a request to exhaust suspension pressure.

3. The trailer controller as in claim 2, wherein the air suspension signal indicative of a request to exhaust suspension pressure is received from a manually operated switch.

4. The trailer controller as in claim 2, wherein the air suspension control output is configured to control an electropneumatic valve coupled to the suspension air bellows.

5. The trailer controller as in claim 2, wherein the control logic is further capable of maintaining the lift axle as lowered while transmitting the air suspension control signal.

6. The trailer controller as in claim 2, further comprising:
    at least one speed input for receiving a signal indicative of a speed of a trailer; wherein the control logic is further capable of transmitting the air suspension control signal to exhaust pressure in the air suspension bellows in response to the air suspension signal indicating a request to exhaust suspension pressure and the speed being less than a predetermined speed.

7. The trailer controller as in claim 6, wherein the speed signal indicative of a speed of the trailer is received from at least one wheel speed sensor on the trailer.

8. The trailer controller as in claim 6, wherein the predetermined speed is about ten mph.

9. The trailer controller as in claim 1, wherein the lift axle control output is configured to control an electropneumatic valve coupled to a lift axle air bellows.

10. The trailer controller as in claim 1, wherein the signal indicative of the pressure value in the air suspension bellows is received from a pressure switch.

11. The trailer controller as in claim 1, wherein the predetermined pressure value is about five pounds per square inch.

12. The trailer controller as in claim 1, further comprising a weight input, wherein the control logic is further capable of transmitting the lift axle control signal to raise the lift axle in response to a weight value at the weight input being less than a predetermined weight value.

13. The trailer controller as in claim 12, wherein the predetermined weight value is a value selected to be less than half of the rated weight of the trailer.

14. A system for controlling a lift axle and an air suspended axle on a trailer comprising:
    a manual switch to transmit a signal indicative of a driver request to exhaust suspension pressure;
    a pressure sensing device for transmitting a signal indicative of a pressure value in an air suspension bellows coupled to an air suspended axle;

at least one wheel speed sensor for determining the speed of the trailer;

a first electropneumatic valve for controlling a lift axle;

a second electropneumatic valve for controlling a suspension pressure for the air suspended axle; and a controller having control logic, the control logic capable of:

transmitting a lift axle control signal to the first electropneumatic valve to raise the lift axle;

receiving the air suspension signal indicative of a request to exhaust suspension pressure in the air suspended axle;

receiving the speed signal indicative of the speed of the trailer;

transmitting an air suspension control signal to exhaust pressure in the air suspension bellows in response to signal indicative of a driver request to exhaust suspension pressure and the speed being less than a predetermined speed;

receiving the signal indicative of the pressure value in the air suspension bellows; and transmitting a lift axle control signal to lower the lift axle in response to the pressure value being less than a predetermined pressure value.

15. The system as in claim 14, wherein the air suspension bellows is located on a rear axle of the trailer and the lift axle air bellows are located on a front axle of the trailer.

16. The system as in claim 14, wherein the predetermined speed is about ten miles per hour.

17. The system as in claim 14, wherein the predetermined pressure value is about five pounds per square inch.

* * * * *